United States Patent
Choe et al.

(10) Patent No.: US 8,401,276 B1
(45) Date of Patent: Mar. 19, 2013

(54) 3-D RECONSTRUCTION AND REGISTRATION

(75) Inventors: Tae Eun Choe, Reston, VA (US); Gerard Medioni, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 927 days.

(21) Appl. No.: 12/469,638

(22) Filed: May 20, 2009

Related U.S. Application Data

(60) Provisional application No. 61/054,763, filed on May 20, 2008.

(51) Int. Cl.
G06K 9/00 (2006.01)
G06K 9/46 (2006.01)
G06K 9/40 (2006.01)
G06K 9/36 (2006.01)
G06K 9/32 (2006.01)
G06T 15/00 (2006.01)
G01C 3/14 (2006.01)

(52) U.S. Cl. ........ 382/154; 382/203; 382/266; 382/285; 382/294; 345/419; 356/12

(58) Field of Classification Search .................. 382/154, 382/203, 266, 285, 294; 345/419; 356/12
See application file for complete search history.

(56) References Cited

U.S. PATENT DOCUMENTS

| | | | | |
|---|---|---|---|---|
| 6,047,078 A * | 4/2000 | Kang | ............... | 382/107 |
| 6,137,491 A * | 10/2000 | Szeliski | ............... | 345/419 |
| 6,711,293 B1 | 3/2004 | Lowe | | |
| 6,714,672 B1 * | 3/2004 | Berestov et al. | ............... | 382/154 |
| 7,359,526 B2 * | 4/2008 | Nister | ............... | 382/100 |
| 7,508,977 B2 * | 3/2009 | Lyons et al. | ............... | 382/154 |
| 8,035,639 B2 * | 10/2011 | Witte | ............... | 345/419 |
| 8,059,887 B2 * | 11/2011 | Fields et al. | ............... | 382/154 |
| 8,144,238 B2 * | 3/2012 | Kotake et al. | ............... | 348/349 |
| 2001/0022850 A1 * | 9/2001 | Yang et al. | ............... | 382/154 |
| 2003/0085891 A1 * | 5/2003 | Lyons et al. | ............... | 345/420 |
| 2004/0080712 A1 * | 4/2004 | Yokota et al. | ............... | 351/206 |
| 2004/0179728 A1 * | 9/2004 | Littlefield et al. | ............... | 382/154 |
| 2005/0088515 A1 * | 4/2005 | Geng | ............... | 348/47 |
| 2005/0089213 A1 * | 4/2005 | Geng | ............... | 382/154 |
| 2005/0152590 A1 * | 7/2005 | Thieret et al. | ............... | 382/131 |
| 2007/0031001 A1 * | 2/2007 | Hamanaka | ............... | 382/103 |
| 2007/0110285 A1 * | 5/2007 | Hanna et al. | ............... | 382/117 |
| 2007/0122001 A1 * | 5/2007 | Wang et al. | ............... | 382/103 |
| 2008/0152213 A1 * | 6/2008 | Medioni et al. | ............... | 382/154 |

(Continued)

OTHER PUBLICATIONS

Tsai, "A Versatile Camera Calibration Technique for high-Accuracy 3D Machine Vision Metrology Using Off-the-Shelf TV cameras and lenses", Aug. 1987, IEEE Journal of Robotics and Automationm pp. 323-344.*

(Continued)

Primary Examiner — Kathleen Y Dulaney
(74) Attorney, Agent, or Firm — Fish & Richardson P.C.

(57) ABSTRACT

Generating three-dimensional information can include accessing multiple different images of an object taken by one or more cameras; selecting one of the accessed images as a reference image; identifying corresponding features between the reference image and one or more different ones of the accessed images; determining first camera pose information for each accessed image based on one or more of the corresponding features, each first camera pose information indicative of a relationship between an imaging device and the object; determining a first three-dimensional structure of the object based on first camera pose information of two of the accessed images; and generating a second three-dimensional structure and a second camera pose information for each accessed image based on the first three-dimensional structure and the first camera pose information for each accessed image.

27 Claims, 13 Drawing Sheets

U.S. PATENT DOCUMENTS

| | | | |
|---|---|---|---|
| 2008/0205748 A1* | 8/2008 | Lee et al. | 382/154 |
| 2008/0232545 A1* | 9/2008 | Wu et al. | 378/22 |
| 2008/0292180 A1* | 11/2008 | Kobayashi et al. | 382/154 |
| 2008/0298672 A1* | 12/2008 | Wallack et al. | 382/154 |
| 2009/0110267 A1* | 4/2009 | Zakhor et al. | 382/154 |
| 2010/0034432 A1* | 2/2010 | Ono et al. | 382/118 |

OTHER PUBLICATIONS

Besl, P. and N. McKay "A Method for Registration of 3-D Shapes," IEEE Transactions on Pattern Analysis and Machine Intelligence, 14(2) pp. 239-255, 1992.

Brown, M. and D. G. Lowe, "Recognising panoramas," Proceedings of the Ninth IEEE International Conference on Computer Vision (ICCV '03), vol. 2, pp. 1218-1225.

Buades, A. et al., "A non-local algorithm for image denoising,". CVPR '05, vol. 2, pp. 60-65.

Can, A. et al., "A feature-based, robust, hierarchical algorithm for registering pairs of images of the curved human retina," IEEE Transacations on Pattern Analysis and Machine Intelligence, vol. 24, No. 3, pp. 347-364 (Mar. 2002).

Cattin, P. et al., "Retina mosaicing using local features," MICCAI 2006, LNCS 4191, pp. 185-192, 2006.

Choe, T.E. and I. Cohen, "Registration of multimodal fluorescein images sequence of the retina,", ICCV 2005, pp. 106-113, 2005.

Choe, T.E. and G. Medioni, "3-D Metric Reconstruction and Registration of Images of Near-Planar Surfaces," IEEE 11th International Conference on Computer Vision, ICCV '07, Oct. 14-21, 2007, vol. 1., pp. 1-8.

Choe, T.E. and I. Cohen, G. Medioni, "3-D Shape Reconstruction of Retinal Fundus," CVPR 2006, pp. 2277-2284, 2006.

Choe, T.E. and I. Cohen, G. Medioni, A.C. Walsh, S.R. Sadda, "Evaluation of 3-D Shape Reconstruction of Retinal Fundus," MICCAI 2006, pp. 134-141, 2006.

Choe, T.E. et al., "2-D Registration and 3-D Shape Reconstruction of the Retinal Fundus from Fluorescein Images," Journal of Medical Image Analysis, pp. 174-190 Apr. 2008.

Fischler, M.A. and R. C. Bolles, "Random sample consensus: a paradigm for model fitting with applications to image analysis and automated cartography," Communications of the ACM, 24(6):381-395, Jun. 1981.

Frahm, J.M. and M. Pollefeys, "RANSAC for (Quasi-) Degenerate data (QDEGSAC)," Proceedings of the 2006 IEEE Computer Society Conference on Computer Vision and Pattern Recognition (CVPR'06), pp. 453-460, 2006.

Gluckman, J. and S.K. Nayar, "Rectifying transformations that minimize resampling effects," Proceedings of the 2001 IEEE Computer Society Conference on Computer Vision and Pattern Recognition (CVPR '01), pp. I-111-I-117, 2001.

Hipwell, J.H. et al., "Quantifying changes in retinal circulation: the generation of parametric images from fluorescein angiograms," Physiol. Meas., 19:65-180, 1998.

Kelman, A. et al., "Keypoint descriptors for matching across multiple image modalities and non-linear intensity variations," Proceedings of the 2007 IEEE Computer Society Conference on Computer Vision and Pattern Recognition (CVPR '07), 7 pages, 2007.

Knight, J. and I. Reid, "Binocular Self-Alignment and Calibration from Planar Scenes," ECCV 2000, LNCS 1843, pp. 462-476, 2000.

Kumar, R. et al. , "Shape Recovery From Multiple Views: A Parallax Based Approach," Proceedings of the Image Understanding Workshop, Monterey, Calif., vol. II, pp. 947-955, Nov. 13-16, 1994.

Lin, Y. and G. Medioni, "Retinal image registration from 2D to 3D," IEEE Conference on Computer Vision and Pattern Recognition, 2008. CVPR 2008, Jun. 23-28, 2008, Anchorage, AK, pp. 1-8.

Lourakis, M.I.A. and A.A. Argyros, "The Design and Implementation of a Generic Sparse Bundle Adjustment Software Package Based on the Levenberg-Marquardt Algorithm," FORTH-ICS / TR-340, 23 pages, Aug. 2004.

Lowe, D.G., "Distinctive image features from scale-invariant keypoints," International Journal of Computer Vision, 60(2):91-110, 2004.

Reza, A.M., "Realization of the contrast limited adaptive histogram equalization (CLAHE) for real-time image enhancement," Journal of VLSI Signal Processing, 38(1):35-44, 2004.

Scharstein, D. et al.,. "A taxonomy and evaluation of dense two-frame stereo correspondence algorithms," Proceedings of the IEEE Workshop on Stereo and Multi-Baseline Vision (SMBV '01), pp. 131-140, 2001.

Stewart, C. V. et al., "The dual-bootstrap iterative closest point algorithm with application to retinal image registration," IEEE Trans on Medical Imaging, 22(11):1379-1394, Nov. 2003.

Triggs, B. "Autocalibration from planar scenes," ECCV 1998 pp. 89-105, 1998.

Triggs, B. et al., "Bundle Adjustment a Modern Synthesis," Vision Algorithms: Theory and Practice, International Workshop on Vision Algorithms Coorfu, Greece, Sep. 1999, Lecture Notes in Computer Science, v. 1883, pp. 298-372, B. Trigss et al. (Eds.) Springer-Verlag, 2000.

Viola, P.A. and W.M. Wells, III. Alignment by maximization of mutual information. International Journal of Computer Vision, 24(2):137-154, Sep. 1997.

* cited by examiner

Algorithm: Iterative Nearest Neighbor Matching

> input : Features $\Gamma_i$ and $\Gamma_j$ with respect to image $I_i$ and $I_j$
> output: Homography $H_{i,j}$ and matches $M_{i,j}$
>
> 1    *initialize $H_{i,j} \leftarrow I$, $r \leftarrow r_{max}$;*
> 2    while $r > r_{min}$ do
> 3        $M_{i,j} \leftarrow$ NN-Match $(\Gamma_i, \Gamma_j, H_{i,j}, r)$;
> 4        $H_{i,j} \leftarrow$ RANSAC $(M_{i,j})$;
> 5        $r \leftarrow r/2$;
> 6    end

3-D RECONSTRUCTION AND REGISTRATION

PRIORITY CLAIM

This document claims the benefit of U.S. Provisional Application No. 61/054,763 entitled "3-D RECONSTRUCTION OF A NEAR-PLANAR SURFACE IN DIGITAL IMAGE PROCESSING" and filed on May 20, 2008, which is incorporated by reference as part of the disclosure of this document.

FEDERALLY SPONSORED RESEARCH OR DEVELOPMENT

The invention in this document was made with government support under Grant Nos. R21 EY015914-01 and R21 EY015914-03 awarded by the National Institutes of Health. The government has certain rights in the invention.

BACKGROUND

This document relates to generating three-dimensional (3-D) information from two-dimensional (2-D) images.

Various imaging devices such as digital cameras and digital video recorders can produce two-dimensional images. Two-dimensional images of an object can come from an imaging device capturing different orientations of the object. In some implementations, two-dimensional images of an object can come from one or more imaging devices at different device locations with respect to the object.

SUMMARY

This document describes technologies, among other things, for generating three-dimensional information from two-dimensional images.

In one aspect, methods for generating three-dimensional information can include accessing multiple different images of an object taken by one or more cameras; selecting one of the accessed images as a reference image; identifying corresponding features between the reference image and one or more different ones of the accessed images; determining first camera pose information for each accessed image based on one or more of the corresponding features, each first camera pose information indicative of a relationship between an imaging device and the object; determining a first three-dimensional structure of the object based on first camera pose information of two of the accessed images; and generating a second three-dimensional structure and a second camera pose information for each accessed image based on the first three-dimensional structure and the first camera pose information for each accessed image. Other implementations can include corresponding systems, apparatus, and computer programs, configured to perform the actions of the methods, encoded on computer readable mediums.

These and other implementations can include one or more of the following features.

Each accessed image can have near-planar surface depiction of the object. Each camera pose information can include a rotation matrix, a translation vector, and a focal length value.

Some implementations can include projecting points of the reference image to the second three-dimensional structure based on the second camera pose information associated with the reference image; and re-projecting the projected points onto a second one of the accessed images based on the second camera pose information associated with the second one of the accessed images; and using the re-projected points to register the second one of the accessed images in three dimensions.

Determining the first three-dimensional structure can include determining points on a three-dimensional structure that correspond to points on the two of the accessed images. Generating the second three-dimensional structure and second camera pose information for each accessed image can include adjusting the first three-dimensional structure and/or the first camera pose information for each accessed image to back-project a three-dimensional structure based on a respective camera pose information onto a respective one of the accessed images.

Selecting one of the accessed images as the reference image can include identifying features of each accessed image; using the identified features of each accessed image and an iterative nearest neighbor matching algorithm to determine and refine homographies and feature matches between pairs of the accessed images; and using an image with a least total shortest path cost to the other accessed images as the reference image. In some implementations, a determination of the least total shortest path cost is based on the refined homographies.

Some implementations can include selecting one of the accessed images as a widest baseline image, the widest baseline image corresponding to a camera position with a widest baseline with respect to the image; determining a third three-dimensional structure of the object based on a mapping of points between the reference image and the widest baseline image; and refining the second camera pose information for each accessed image different from the widest baseline image based on the widest baseline image. Some implementations can include projecting points of the reference image to the third three-dimensional structure based on the refined second camera pose information associated with the reference image; and re-projecting the projected points onto a second one of the accessed images based on the refined second camera pose information associated with the second one of the accessed images; and using the re-projected points to register the second one of the accessed images in three dimensions.

Some implementations can include registering the accessed images in two-dimensions. Registering in two-dimensions can include identifying one or more features of each accessed image and generating a two-dimensional representation of each feature of each accessed image. Identifying corresponding features can include using two or more of the two-dimensional representations.

In another aspect, techniques can include obtaining multiple different images of an object, each image having a near-planar surface depiction of the object; registering the multiple different images in two-dimensions, the registering including identifying one or more features of each image and generating a two-dimensional representation of each feature; selecting a first image and a second image from the registered images; generating one or more correspondences between one or more features of the first image and one or more features of the second image; estimating a camera parameter set for each of the first and second images within respective ones of the identified features, each camera parameter set including a rotation matrix, a translation vector, and one or more focal lengths; reconstructing a three-dimensional structure of the object in Euclidean space responsive to the one or more correspondences and the estimated camera parameter sets; refining the estimated camera parameter sets using the three-dimensional structure; and refining the three-dimensional structure using the refined camera parameter sets. In some implementations, the methods, systems, and computer program products can also include registering at least a portion of the multiple different images in three-dimensions using the refined three-dimensional structure. In some implementations, the methods, systems, and computer program products can also include identifying registration errors of the registered images; and selecting the images responsive to the registration errors. Other implementations can include corresponding systems, apparatus, and computer programs, configured to perform the actions of the methods, encoded on computer readable mediums.

In another aspect, an image processing system can include a source for images, such as a digital scanner, camera, or camera, and a processor coupled to the source to receive and process images. The processor can be configured to perform one or more of the techniques described herein.

In another aspect, an image processing system can include a memory configured to store multiple images of an object; and processor electronics in communication with the memory. The processor electronics can be configured to perform one or more of the techniques described herein.

Particular embodiments of the subject matter described in this document can be implemented so as to realize one or more of the following advantages. The technologies described herein can reconstruct a 3-D representation of an object based on multiple images that have a near-planar surface depiction of the object. Three dimensional reconstructing and registering of an image sequence can provide additional information for the associated object. For example, by inspecting the 3-D shape of a retinal surface, blisters which result from lesions can be readily identified. Using the described technologies can reduce costs and can reduce computational complexity of a reconstruction and/or registration process. The described technologies can increase registrations rates and can be applied to different types of objects and their corresponding near-planar surface depictions.

The details of one or more implementations are set forth in the accompanying attachments, the drawings, and the description below. Other features will be apparent from the description and drawings, and from the claims.

BRIEF DESCRIPTION OF THE DRAWINGS

FIG. 8 shows an example of an iterative nearest neighbor matching algorithm.

FIGS. 9A, 9B, and 9C show different examples of a chained registration technique.

Like reference symbols in the various drawings indicate like elements.

DETAILED DESCRIPTION

The technologies in this document can be used to reconstruct a 3-D structure of an object from 2-D images of the object and to register images in 3-D based on the 3-D structure. These 2-D images can feature a near-planar surface depiction of the object, in which, the object appears as a nearly flat object in the 2-D images. Some objects can have or can appear to have a near-planar 3-D surface, such as man-made structures, e.g., façades of buildings, terrain images from a satellite, and natural structures such as a human retina or an image of a 3-D object taken at distance.

Near-planar can be defined with respect to a parallax range, in which the parallax range is a function of the depth range of a structure and baseline of cameras. For example, near-planar surface images can have around 5 to 25 parallax range. The parallax range is the scope of lengths of corresponding points in pixel. The parallax range can be defined as four times the standard deviation of lengths of dense corresponding points between two images, which has a 95.45% confidence interval in a normal distribution.

Figure 1B:
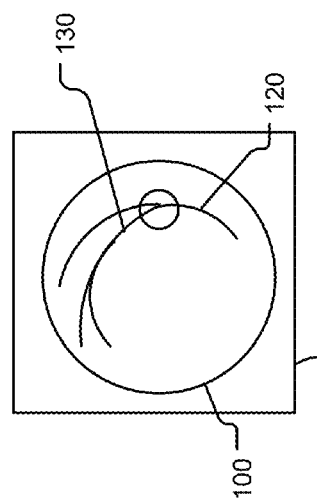
FIGS. 1A, 1B show different retinal fluorescein images of a retina.
Figure 1D:
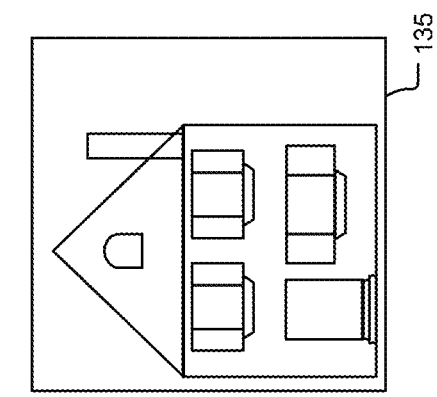
FIGS. 1C, 1D show different images of a building's façade.
Figure 1A:
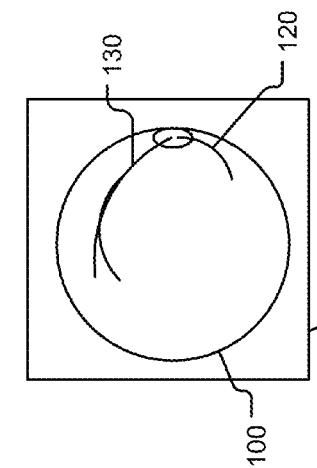
Figure 1C:
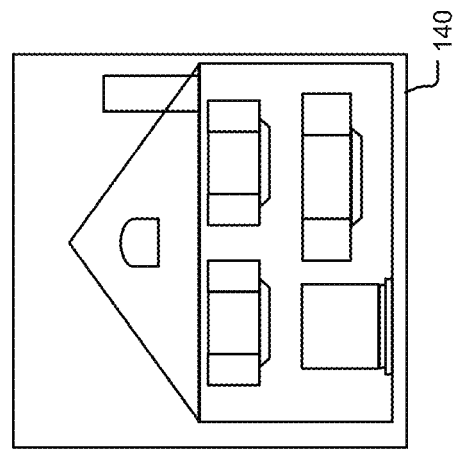

FIGS. 1A, 1B show different retinal fluorescein images of a retina. Images 105, 110 depict different views of an object such as a retina 100. Retina images 105,110 can show blood vessels 120, 130 of the retina 100. The intersections of the retina's blood vessels can provide distinctive features, e.g., Y-features, to compare images, and in turn, identify matching features between different images. FIGS. 1C and 1D show different images 135 and 140 of a building's façade, respectively. Different imaging devices can capture images of an object, and an imaging device's relationship with the object can vary, e.g., orientation, distance, and baseline.

In some techniques, performing registration of images of a near-planar surface in 2-D may generate errors due to 3-D depth information. For a more accurate registration, the 3-D structure of the surface can be used. However, the near-planar surface depictions may make it difficult to estimate a 3-D structure since it is a quasi-degenerate case for the estimation of the geometry from images. For metric reconstruction of the surface, the plane at infinity and the absolute conic can be estimated when camera poses, e.g., camera parameters, are not provided.

Image sequences can include different fluorescein angiography images of a retinal fundus. The fluorescein angiogram of a retinal fundus can have the following properties. (1) The retinal fundus has a shallow depth. The overall shape is a patch of a sphere, but there is intrusion in the optic disc, and sometimes there are extruded blisters due to diabetic retinopathy. (2) The intensity level of angiograms changes significantly during the circulation of the fluorescein dye. (3) Camera motion is close to a translation. Thus, angle differences of cameras are small. In the middle phase of a fluorescein sequence, images have many vessels and their bifurcations with high contrast. In contrary, the early and the late phases of fluorescein sequence pairs have fewer vessels with lower contrast. Thus, when we try to find matching points across images, (4) the number and the position of the matching features of image pairs may be inconsistently distributed. These properties may make it difficult to use methods such as an auto-calibration method for planar scenes. Further, machines such as an optical coherence tomography (OCT)

machine that provide an in vivo cross-sectional view of the local area of the retina may be cost prohibitive and/or require extensive training.

One implementation of the technologies described herein can include an automatic technique for reconstruction and registration of images of near-planar surfaces such as the retina. The technique can be used to determine a dense 3-D depth from the most accurately registered pair of images. Even if the number of matching points of early or late phase of fluorescein images is small, the technique can estimate at least the camera parameters of those images. Combining a dense 3-D depth structure and the images with camera motion, the technique can reconstruct and register a full set of fluorescein images in 3-D.

A technique for 3-D structure reconstruction and 3-D registration can include accessing multiple images of an object and registering the images in 2-D using a global registration algorithm. In some implementations, the entire technique can be fully automated. The technique can use a multi-pass bundle adjustment such as a 3-pass, 4-pass, N-pass bundle adjustment to estimate the camera parameters of each image and reconstruction of a 3-D structure of an object.

In a 3-pass bundle adjustment, a first bundle adjustment can determine initial camera positions in metric space, such as an Euclidean space. For input to a second bundle adjustment, the technique can select two images and can generate a dense disparity map between the pair. Some implementations can compute the epipolar geometry between these two images using a plane+parallax approach, and can use mutual information for a matching criteria. Some implementations can select a pair of images with the lowest 2-D registration error. A second bundle adjustment can transform the disparity map into a dense metric depth map based on fixing the corresponding two camera positions. A third bundle adjustment is performed to refine both camera positions and a 3-D structure.

In some implementations, each image can be back-projected to the reconstructed 3-D structure based on the camera parameters and re-projected again to the reference image to acquire the final registration. In some implementations, images are back-projected to the 3-D structure for a 3-D registration.

Figure 2:
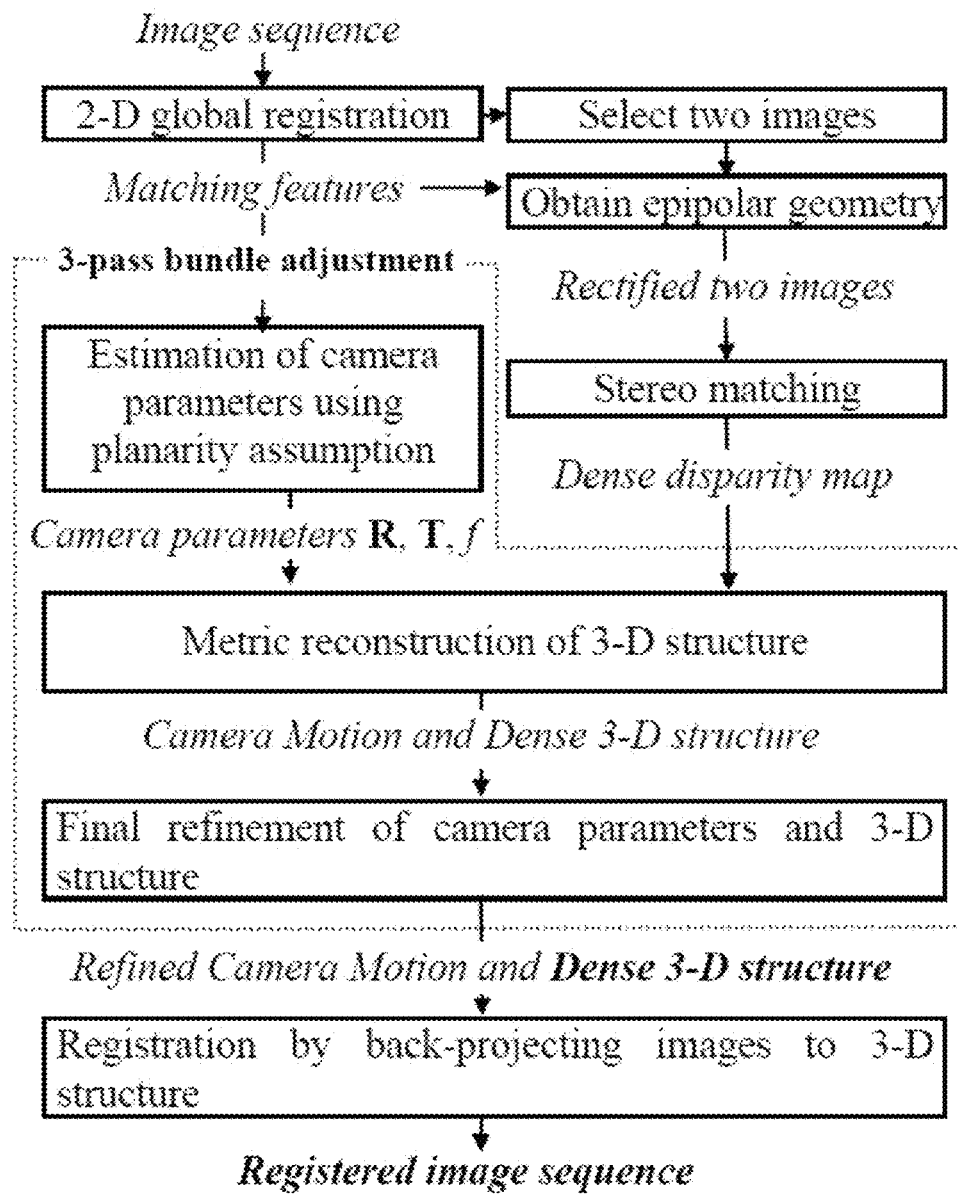
FIG. 2 shows an example of a three-dimensional reconstruction and registration technique.

FIG. 2 shows an example of a three-dimensional reconstruction and registration technique. The technique can register images in 2-D using a global registration algorithm. A pair of images with the lowest registration error can be selected and a dense disparity map of the pair can be obtained using the plane+parallax algorithm for the geometry, and mutual information for a matching criterion. The technique can use a multi-pass bundle adjustment algorithm for the estimation of the camera parameters of each image and for the reconstruction of a 3-D structure. To take depth effects into account, it can be assumed that the majority of the scene is planar when applying the technique. The scene is estimated as a plane and 3-D depth information out of the plane is considered to acquire the 3-D geometry from the images. Using the camera parameters, the technique can back-project multiple images to the reconstructed 3-D structure and re-project them again to the reference image to acquire a 3-D registration.

In registering images in 2-D, some implementations can use a global registration algorithm (see, e.g., T. E. Choe, I. Cohen, "Registration of multimodal fluorescein images sequence of the retina,", ICCV 2005, pp. 106-113, 2005). A 2-D registration method can utilize the location of the retina blood vessels' bifurcation, so-called Y-feature, as an invariant geometric feature since a Y-feature may be more robustly extracted on extensively intensity-varying fluorescein images. Y-features can be extracted using an articulated model and matched across images using mutual information. The global registration method, using an all pairs' shortest path algorithm, can determine a reference image and the reference image's connections to other images with the lowest sum of registration errors.

In some implementations, techniques for three-dimensional reconstruction can use a 3-D shape inference to estimate the 3-D dense disparity map of a near-planar surface. Some implementations can make use of a planarity assumption, where a plane+parallax algorithm is applied to estimate a fundamental matrix (see, e.g., R. Kumar, P. Anandan and K. Hanna, "Shape Recovery From Multiple Views: A Parallax Based Approach," DARPA IU Workshop, Monterey, Calif., November 1994). After estimating a 2-D homography from four corresponding points in the plane and adding two more points from the parallax residuals, the fundamental matrix F is acquired. Some implementations can rectify the images using Gluckman and Nayar's algorithm by obtaining 2-D rectification homographies, $T_1$ and $T_2$, minimizing re-sampling effects (see, e.g., J. Gluckman and S. K. Nayar, "Rectifying transformations that minimize resampling effects," CVPR 2001, pp. 111-117, 2001).

The search range of the disparity can be determined by Gaussian assumption of Y-features' distribution (see, e.g., T. E. Choe, I. Cohen, G Medioni, "3-D Shape Reconstruction of Retinal Fundus," CVPR 2006, pp. 2277-2284, 2006). Subsequently, a point in a rectified image $I^R_1(x,y)$ is matched with that of $I^R_2(x+d, y)$ in the 1-D search range $d \in S$. Mutual information is used as a matching criterion (see, e.g., P. A. Viola and W. M. Wells, III, "Alignment by maximization of mutual information," International Journal of Computer Vision, 24(2):137-154, September 1997), since mutual information is robust to intensity changes in the fluorescein images. The disparity map D is calculated by the following equation:

$$D(x, y) = \underset{d \in S}{\mathrm{argmax}} E_{MI}(I^R_1(x, y), I^R_2(x+d, y))$$

where $E_{MI}$ calculates mutual information between two rectangular neighborhood windows centered on the specified position. The disparity map D describes the correspondence of $I^R_1$ and $I^R_2$ such as, $$I^R_1(x,y) \approx I^R_2(x+D(x,y),y)$$

The above equation can be transformed to original positions $I_1$ and $I_2$ by applying inverse rectification homographies $T_1^{-1}$ and $T_2^{-1}$:

$$I'_1(x_1,y_1)=T_1^{-1} I^R_1(x,y)$$

$$I'_2(x_2,y_2)=T_2^{-1} I^R_2(x+D(x,y),y)$$

$I'_1(x_1, y_1)$ and $I'_2(x_2, y_2)$ are the corresponding points in the original images. A multi-pass bundle adjustment can use these dense correspondences to determine a dense 3-D reconstruction. In some implementations, a multi-pass bundle adjustment can use a dense disparity map in determining an initial reconstruction of a 3-D structure.

When camera parameters are unknown, a stratified reconstruction algorithm can reconstruct a surface first in projective, second in affine, and third in metric space, step by step. After obtaining a fundamental matrix by a plane+parallax algorithm, we can induce projective transformation matrices by $$P_1=[I|0], P_2=[[e']\times F|e']$$

where e' is an epipole. Denoting points in the 3-D structure as X, then the projected image points are $x_1=P_1X$ for image $I_1$ and $x_2=P_2X$ for $I_2$.

Figure 3B:
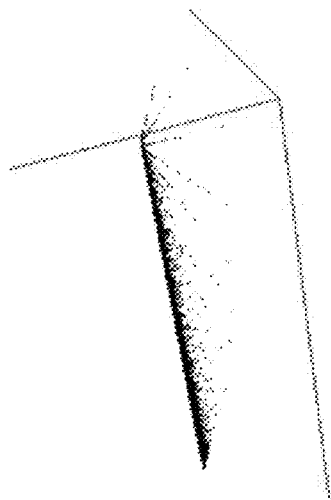
FIG. 3 shows an example of a projective reconstruction of a retinal fundus.
Figure 3A:
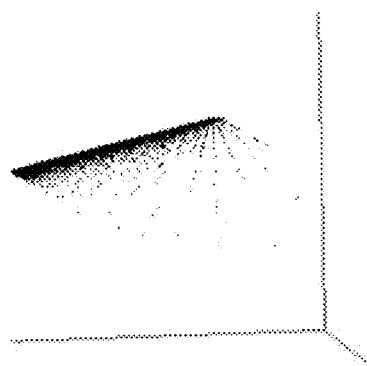

If we find the plane at infinity, the affine transformation matrices can be obtained by applying the 3-D homography $H_a$ such that $$P_{a1}=P_1H_a^{-1}, P_{a2}=P_2H_a^{-1}, \text{and } X_a=H_aX$$

where $$H_a = \begin{bmatrix} I \mid 0 \\ \pi_\infty \end{bmatrix},$$

and $\pi\infty$ is the plane at infinity. We need three vanishing points to define the plane at infinity $\pi\infty$. However, the 3-D depth of a surface may be too shallow to determine the vanishing point in the depth direction, and can, therefore, hinder proceeding to the next step of a stratified reconstruction algorithm. FIG. 3 shows an example of a projective reconstruction of a retinal fundus. The 3-D points can be estimated by triangulation. Since the reconstructed points are on the plane, we cannot estimate the plane at infinity.

Some techniques may simultaneously determine the internal and external camera parameters for each image and reconstruct the 3-D scene structure in metric space, such techniques can use a Levenberg-Marquardt minimization method to determine such information. However, applying a technique to initially determine both the camera parameters and the 3-D structure at the same time may lead to very poor performance since such a technique may easily fall into local minima. A multi-pass bundle adjustment technique can address this situation, e.g., when we try to estimate the camera parameters first, the 3-D structure is not provided, and vice versa.

Figure 4A:
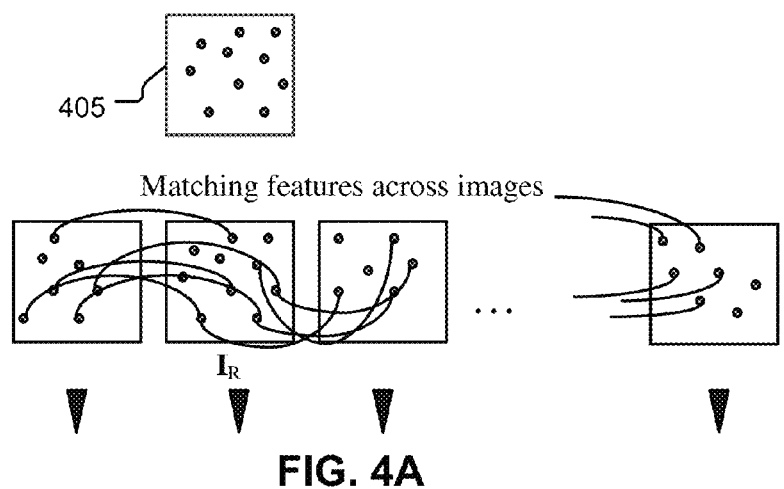
FIGS. 4A, 4B, 4C show examples of different passes of a three-pass bundle adjustment technique.
Figure 4B:
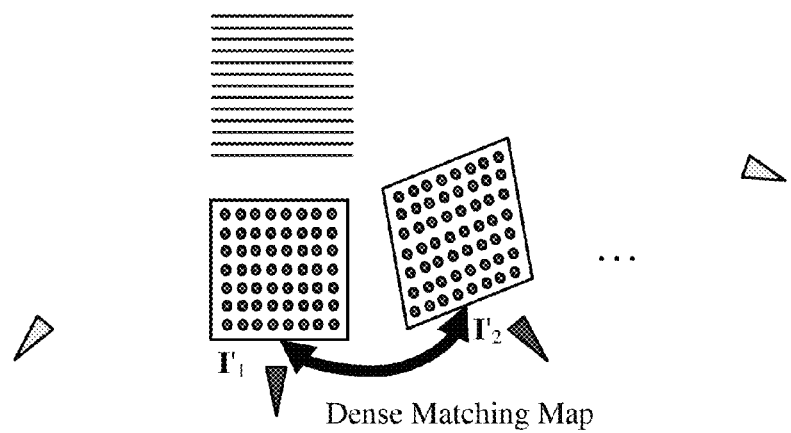
Figure 4C:
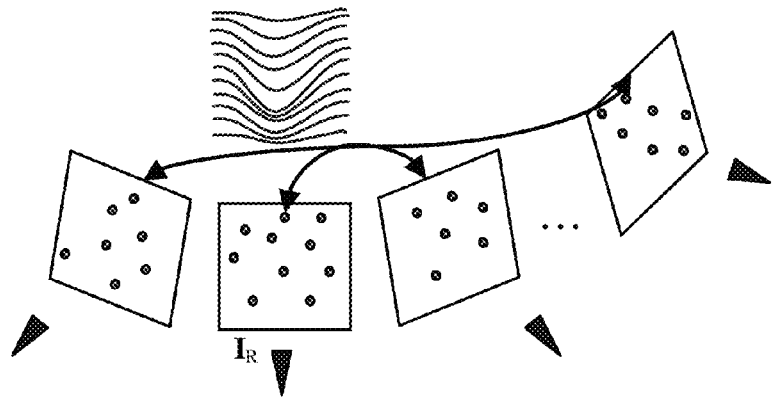

FIGS. 4A, 4B, 4C show examples of different passes of a three-pass bundle adjustment technique. In these figures, $I_R$ is the reference image and the triangle indicates a camera pose, e.g., camera position, camera motion. Camera pose information can include a rotation matrix R, translation vector T, and focal length f. A first bundle adjustment can assume a planar structure, and then estimate camera motion of each image. For example, the first bundle adjustment can use a plane parallel to a reference image so that the initially estimated 3-D points are on the plane. A second bundle adjustment can fix two camera motions to estimate a 3-D structure. A third bundle adjustment can refine camera motion and the 3-D structure.

FIG. 4A shows an example of the initial settings and a first-pass bundle adjustment. The first-pass bundle adjustment can estimate the rotation matrix $R_i$, the translation vector $T_i$ of each camera, and focal length $f_i$ (i=1, ..., m, and m is the number of images in a sequence) from the matching features, e.g. Y-features, across images. The first-pass of bundle adjustment can use a fixed shape such as a plane 405 for the initial shape of a 3-D structure X. The first-pass can also determine the depth of the whole 3-D plane. In some implementations, the camera parameters are estimated by minimizing the following re-projection error, $$E(P, X) = \sum_{i=1}^{m} \sum_{j=1}^{n_i} \|x_{ij} - P_i X_j\|$$

where $x_{ij}$ is j-th feature position in the image i, $n_i$ is the number of corresponding features in the image i, $P_i=K_i[R_i|T_i]$, and the internal camera parameter $K_i$ includes the focal length $f_i$.

In some implementations, an initial 3-D structure can be set to have the same size as the reference image plane. Therefore, the width and the height of the 3-D structure can be the same as those of the reference image and the planar 3-D structure can be parallel to the reference image. Some implementations can assume that there is no skew and an imaging area, such as a CCD cell, of an imaging device cell is a square to estimate the focal length f for the internal camera parameters.

FIG. 4B shows an example of a second-pass bundle adjustment. The second-pass bundle adjustment can fix the camera parameters of two images such as images $I'_1$ and $I'_2$. The second-pass can estimate the 3-D structure from the dense correspondences of the stereo images, $I'_1$ and $I'_2$. In some implementations, the index order of points of the dense 3-D structure is the same as that of the reference image to refer the back-projected positions of the 3-D structure in a 3-D registration process. Since it is assumed that the surface is a plane, the points not on the plane may cause errors when we re-project the 3-D structures to any image except a reference image. By moving those 3-D points on the plane to a certain 3-D position with minimizing the re-projection error of the second-pass bundle adjustment, the dense 3-D structure can be reconstructed:

$$E(X^d) = \sum_{k=1}^{p} \{\|I'_{1k} - P_1 X_k^d\| + \|I'_{2k} - P_2 X_k^d\|\}$$

where p is the number of dense matching points, $X^d_k$ is 3-D points of those dense matches, and $P_1$ and $P_2$ are the projection matrices of $I'_1$ and $I'_2$.

FIG. 4C shows an example of a third-pass bundle adjustment. The third-pass bundle adjustment can refine both the camera motion for multiple image sequences and the 3-D structure using the same matching features $x_{ij}$, the camera parameters $P_i$ from the first-pass bundle adjustment, and the reconstructed 3-D structure $X^d_j$ from the second-pass bundle adjustment:

$$E(P, X) = \sum_{i=1}^{m} \sum_{j=1}^{n_i} \|x_{ij} - P_i X_j^d\|$$

The three-pass bundle adjustment technique can determine both the internal and external parameters of each camera and the reconstructed 3-D structure. A 3-D registration method can use the reconstructed 3-D structure to provide information about the corresponding object.

Figure 5:
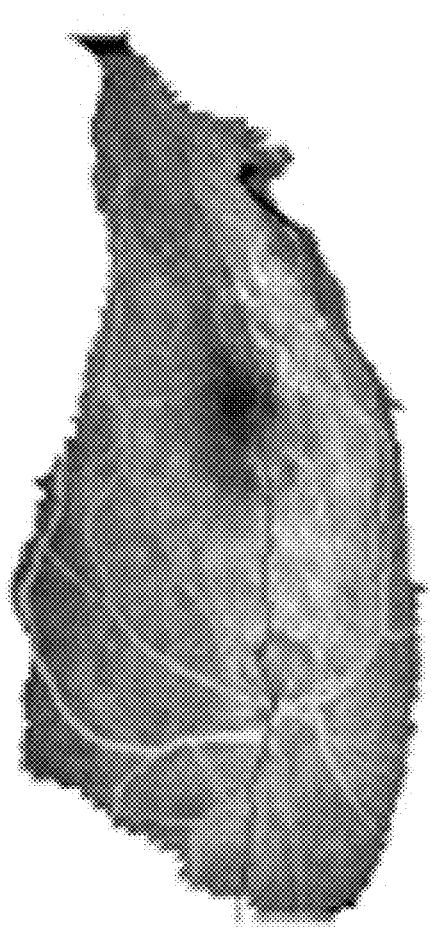
FIG. 5 shows an example of a reconstructed 3-D structure.

FIG. 5 shows an example of a reconstructed 3-D structure of a retinal fundus. The reconstructed 3-D structure of the retinal fundus itself can provide useful information for doctors to diagnose a retinal disease. Some implementations can use the 3-D structure for the registration of other fluorescein images. For ophthalmologists, accurate registration of fluorescein retinal images is a very important issue, because from the intensity changes in a pixel position in fluorescein images, different types of disease can be diagnosed.

The 3-D registration can be perform by using a 3-D structure and different camera positions to back-project multiple images to the 3-D structure.

Figure 6:
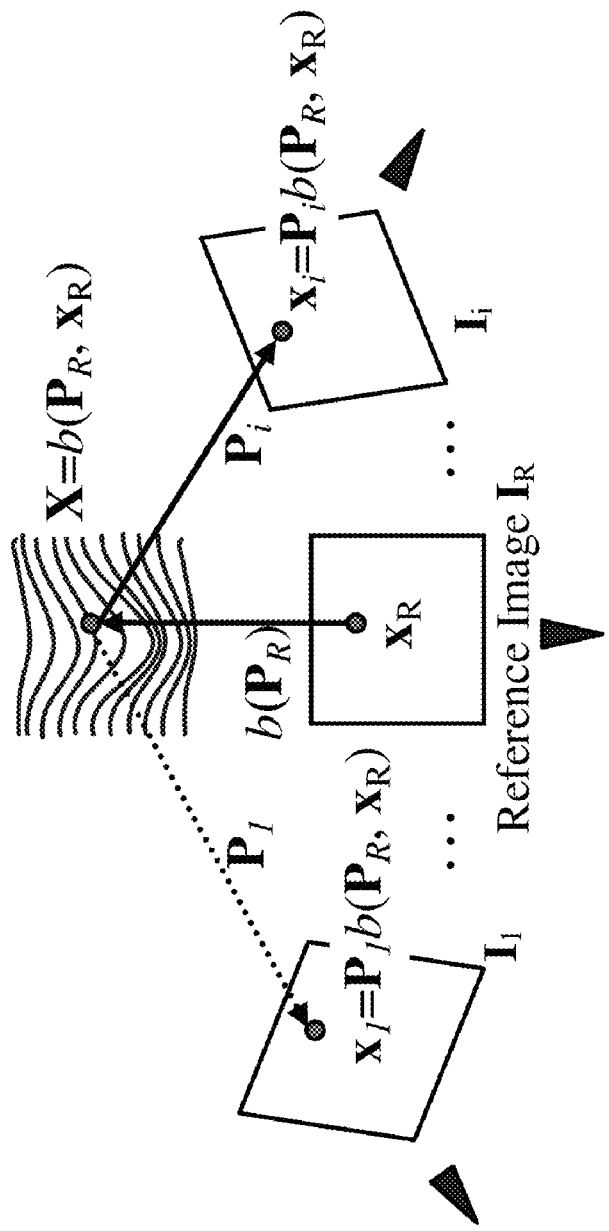
FIG. 6 shows an example of a registration technique that back-projects to a 3-D structure.

FIG. 6 show an example of a registration technique that back-projects to a 3-D structure. The reference image $I_R$ is one of the images with a 3-D dense disparity map. In order to register the i-th image $I_i$ to the reference image $I_R$, pixels $x_R$ in the reference image plane are back-projected to the 3-D structure X, and then, the 3-D point X is projected to the image point $x_i$. To estimate the back-projected 3-D points from the reference frame, we trace back the index of the 3-D structure, which can have the same index order with the reference image used in the three-pass bundle adjustment. The projection matrix $P_R$ for the reference image is $x_R = P_R X$. The function of back-projection b is $X = b(P_R, x_R)$. The 3-D structure X is re-projected to image i by $x_i = P_i X = P_i b(P_R, x_R)$. The pixel value of re-projected position $x_i$ can determine that of registered position of image i. If the re-projected position of $x_i$ is not an integer, the pixel value of $x_i$ can be determined by bilinear interpolation from the neighboring four pixels.

Different implementations can use different 2-D registration and 3-D registration techniques. For 2-D registration, a technique can extract features from the edge maps of contrast enhanced images, and perform pair-wise registration by matching features in an iterative manner to maximize the number of matches and to estimate homographies. The pair-wise registration can be globally optimized by an indirect registration process. For 3-D registration, a technique can register images to a reference frame by transforming points via a reconstructed 3-D surface. In some implementations, after a multi-pass bundle adjustment process, points in the reference image can be back-projected to a 3-D structure and re-projected again to each image to define the pixel value of each point in a registered image.

Figure 7:
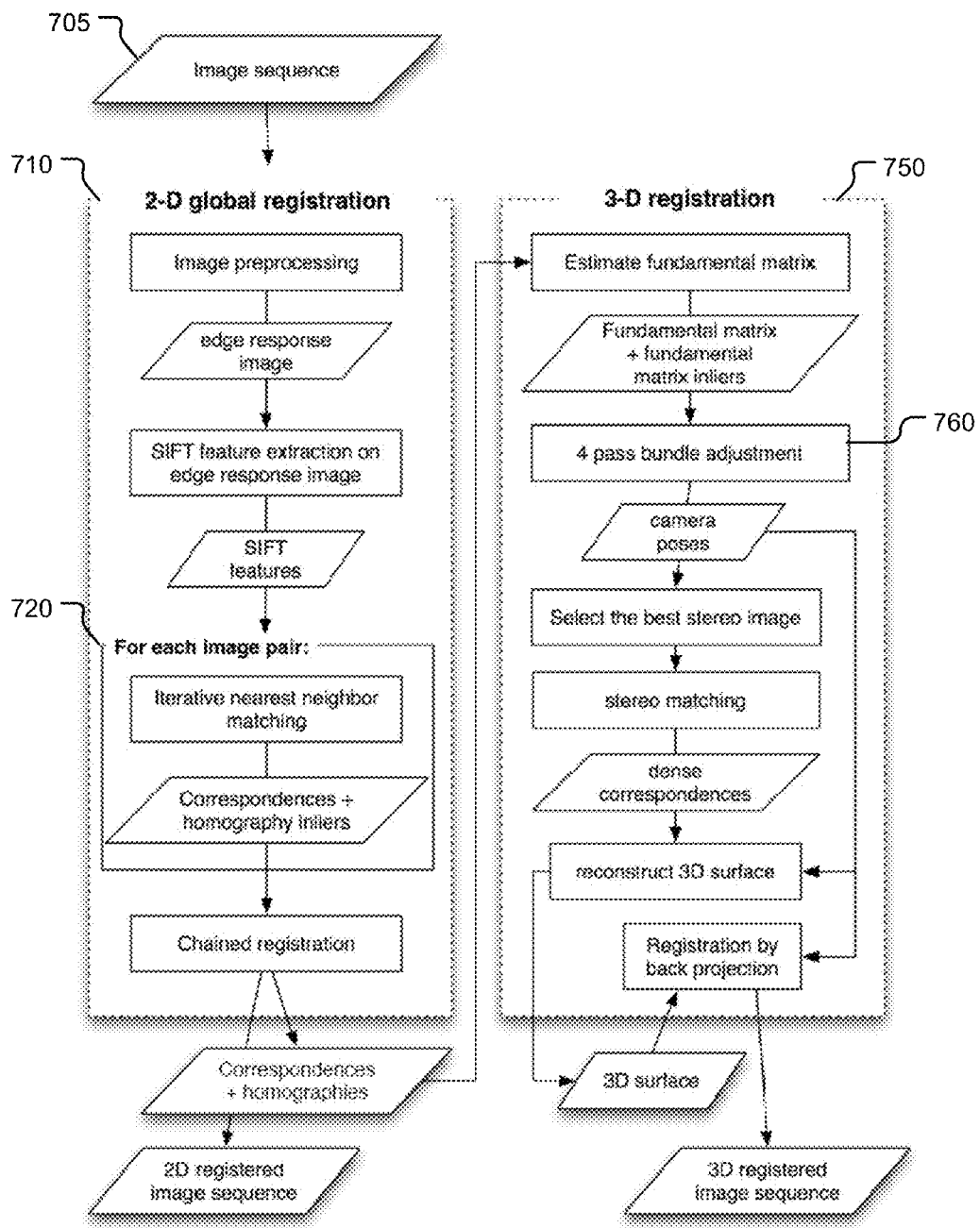
FIG. 7 shows an example of a process using a four-pass bundle adjustment technique.

FIG. 7 shows an example of a process using a four-pass bundle adjustment technique. The process can include a 2-D global registration process 710 and a 3-D registration and reconstruction process 750. The 3-D registration process 750 can include a four-pass bundle adjustment technique 760.

A 2-D global registration process 710 can register images from an image sequence 705. The image sequence 705 can include multiple images of an object. The 2-D global registration process 710 can extract features from the images. In some implementations, the process can extract features from contrast enhanced edge response images. For example, the process can extract Scale Invariant Feature Transform (SIFT) features (see, e.g., D. G. Lowe, "Distinctive image features from scale-invariant keypoints," Int. J. Comput. Vision, 60(2):91-110, 2004).

The 2-D global registration process 710 can use a homography model to derive information between images. Using a homography model may be advantageous for one or more of the following reasons. First, the process can register a local portion of the retinal surface, which can be considered as near planar. Second, a homography model can have few parameters and can be easier to estimate, especially when the matches are noisy. Third, depth variations may be due to anatomical features, which may be unaccounted for by the homography. The process can use a 3-D surface model for 3-D registration. The accuracy of the 3-D surface reconstruction can rely on the accuracy of the fundamental matrix estimation. A technique for such an estimation can use a plane+parallax method and the homography.

The 2-D global registration process 710 can match the features and derive the homography relationship between pairs of images, e.g., iterative method 720. For each pair of images in an iterative method 720, each iteration for a given pair, the homography estimated from a previous iteration can be used to improve the quality of feature matching. This iterative method 720 can register image pairs in the image sequence 705. In some implementations, the output from iterative method 720 is enhanced by chained registration, in which the homography of a poorly registered image pair is estimated by chaining a sequence of related accurate homographies.

A 3-D registration and reconstruction process 750 can use the output from the 2-D global registration process 710. A 3-D registration and reconstruction process 750 can estimate the fundamental matrix for each image with respect to a reference frame. The corresponding fundamental matrix inliers are then input to a 4-pass bundle adjustment to estimate camera poses. To reconstruct the 3-D surface, process 750 can use the image associated with the camera that has the widest baseline with respect to the reference camera for dense stereo matching. The resulting dense correspondences are used to triangulate the 3-D points on the surface. Process 750 can register the images to the reference frame in 3-D by back projection.

The 2-D global registration process 710 can include pre-processing images to enhance the contrast and to generate edge map, extracting SIFT features from the edge maps, and performing pairwise image registration using iterative nearest neighbor matching. In some implementations, the chained registration method is used to further enhance the registration result from previous stage.

The 2-D global registration process 710 can extract features such as SIFT features. Let $\Gamma_i$, $\Gamma_j$ denotes the SIFT features extracted from images $I_i$, $I_j$ respectively. To match features, the nearest neighbor matching (NN-Match) can be used. Each SIFT feature in $\Gamma_i$ is matched to its nearest neighbor in $\Gamma_j$ by computing the Euclidean distance in the feature space. Moreover, to prevent false matching, the distance of the nearest neighbor may be less than the second-nearest neighbor by a ratio such as a ratio of 0.8. Note that with a larger search area, there can be more matching candidates and less probability for a feature to be matched. Let $M_{i,j}$ denotes the set of matches produced from NN-Match, $H_{i,j}$ denotes the homography that warps image $I_i$ to image $I_j$, i.e., $I_j = H_{i,j} (I_i)$. Some implementations can use a RANSAC (RANdom SAmple Consensus) algorithm to estimate $H_{i,j}$ (see, e.g. A. Fischler and R. C. Bolles, "Random sample consensus: a paradigm for model fitting with applications to image analysis and automated cartography" Commun. ACM, 24(6):381-395, 1981). RANSAC can perform several iterations on $M_{i,j}$. At each iteration, a homography model is built and its corresponding inliers correspondences are determined. The best homography estimate is the one with the largest number of inliers.

SIFT feature extraction can produce large amount of descriptive features that increases the number of reliable matches. Edge information can be retrieved easily, and is widely spread across the image. Edge response can preserve the gradient magnitude of the surface and can ignore its gradient direction, which is invariant in multi-modality imagery. In other words, features extracted from edge response images are more likely to be matched.

To extract a large number of SIFT features from the edge response images, we can preprocess the images by enhancing their contrast and removing noise. In some implementations, the intensity histogram is equalized to a Gaussian distribution with $v=128$, $\sigma=48$. In images that have very low contrast, such an operation can generates noise. Some implementations can use a Non-local Mean Filter to do-noise such images (see, e.g., A. Buades, B. Coll, and J.-M. Morel, "A non-local algorithm for image denoising," CVPR '05, vol. 2, pp. 60-65). Some implementations can compute an edge response on the contrast enhanced images using a Sobel filter. Using a technique such as contrast limited adaptive histogram equalization (CLAHE) enhance the contrast of the edge (A. M. Reza, "Realization of the contrast limited adaptive histogram equalization (CLAHE) for real-time image enhancement," J. VLSI Signal Process. Syst., 38(1):35-44, 2004).

Some implementations can use an iterative nearest neighbor matching algorithm to generate corresponding features between image pairs. In some image sequences examples, the displacement between images could be large. To account for large displacement, the size of the neighborhood should be large. However, this may result in fewer matches, which may decrease the accuracy of the homography estimation. Hence, there is a trade off between the displacement we can account for and the number of matches we can produce. If we have a rough estimate of the $H_{i,j}$, a feature at x in $I_i$ can have a higher chance to be matched by performing NN-Match in a smaller neighborhood which centers at $H_{i,j}(x)$. With more matches, a more accurate homography can be estimated.

FIG. 8 shows an example of an iterative nearest neighbor natching (Iter-NNM) Algorithm. Iter-NNM can start with a large search area with radius $r=r_{max}$ and assume the homography $H_{i,j}$ as identity. At each iteration, every feature $x \in \Gamma_i$ is matched to its nearest neighbor in $\Gamma_j$ where the matching candidates are in the search area centers at $H_{i,j}(x)$ with radius r. Then a technique such as RANSAC is employed on the matches to estimate a more accurate homography for the next iteration. It iterates until the smallest search area $r=r_{min}$ is reached. In some implementations, the estimated homography in a previous iteration is used in the next iteration to narrow down the search region and may produce more reliable matches.

In standard RANSAC, the best homography is the one with the largest number of inliers. In other words, the best homography is the one with the highest score which is defined as Score(H)=|HI| where H and HI denotes a homography and its corresponding inliers respectively. However, there may be some cases where the number of ground truth homographies between images are few. In such cases, a good homography estimate may not have significantly more inliers than a poor one. Moreover, two homographies can have the same amount of inliers and using Score(H)=|HI| would not update the homography estimate from one to a better one.

To address this issue, some implementations can modify a RANSAC algorithm to assign each inlier with a weight. A higher weight is given when the orientations of the two matched SIFT features are consistent with respect to the homography estimate:

$$G(m) = CI(H_{i,j}(Ort(x_i)), Ort(x_j))$$

where Ort( ) is the orientation of a SIFT feature, and $m=(x_i, x_j)$ is a pair of match of features in $\Gamma_i, \Gamma_j$ respectively. CI( ) is a consistency indicator function that can include a Gaussian function with $\mu=0$, $\sigma=0.5$. Then the new score for a homography is defined as:

$$\text{Score}(H) = \sum_{m^k \in HI} G(m^k)$$

where $m^k$ is the k-th homography inlier in HI.

Some implementations can bias inliers that spread across the entire image, since with the same amount of inlier correspondences, those that are more uniformly distributed may contribute less error to the homography estimate. Therefore, matches that are densely congregated may be given lower weights. Hence, some implementations can use the following equation for Score(H):

$$\text{Score}(H) = \sum_{m^k \in HI} G(m^k) / D(m^k)$$

where D( ) is a function that measures the inlier density around an inlier, with each inlier $m^k$ weighted by $1/D(m^k)$ as shown.

Figures 9A, 9B, 9C:
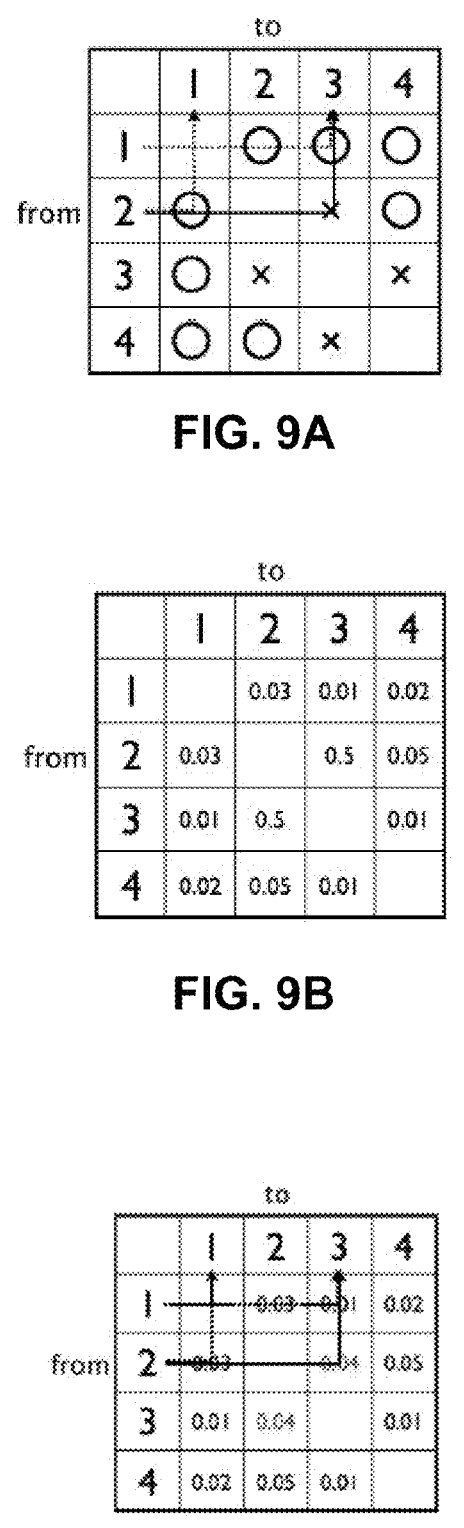

FIGS. 9A, 9B, and 9C show different examples of a chained registration technique. Chained registration is a global optimization approach after the images are pairwise registered in 2-D. With the pair-wise registration result, images can be registered to one another.

FIG. 9A shows an example of relationships between images. Therein, a circle or a cross in row i column j respectively denotes a successful or a failed registration from image $I_i$ to $I_j$. In FIG. 9A, $I_2$ cannot be registered to $I_3$ directly. However, since $I_2$ can be registered to $I_1$ directly, and $I_1$ can be registered to $I_3$ directly, $I_1$ becomes the bridge to register $I_2$ to $I_3$. Some implementations can perform another run of registration, where Iter-NNM is initialize $H_{2,3}$ as $H_{1,3}H_{2,1}$ instead of I, and $r=r_{min}$ instead of $r_{max}$. In other words, we can perform a NN-Match directly in a small area that roughly centers at the matching point. In such a way, we can overcome failure pairs that do not have enough true matches for Iter-NNM to converge to a correct homography.

To select the best images for chained registration, some implementations can use a shortest path algorithm, in which each node represents an image. The internal nodes along the shortest path from i to j are the images used for chained registration. The edge cost $C_{i,j}$ is defined as the inverse of Score($H_{i,j}$):

$$C_{i,j} = 1/\text{Score}(H_{i,j})$$

FIG. 9B shows an example of a cost table that results from direct pair-wise registration, in which the registration from 2 to 3 has a lower score (higher cost). FIG. 9C shows an example of shortest path determinations based on the cost table. Running an additional direct registration can improve registration, where the homography is initialized as $H_{1,3}H_{2,1}$ since $I_2, I_1, I_3$ is the shortest path from $I_2$ to $I_3$.

In some implementations, such as a registration can be performed over every image pair $(I_i, I_j)$. Every time Score($H_{i,j}$) increases, image pairs that have their shortest paths going through edge $I_iI_j$ are reregistered again since the initialization may improve. This process continues until no image pairs receive higher homography scores. Note that the final Score ($H_{i,j}$) may still be low so that the corresponding shortest path goes through other nodes. In such a case, chained homographies along the shortest path can be used as the best homography estimate.

In some implementations, the expression:

$$ref = \arg\min_i \sum_j \text{Cost}_{ShortestPath}(I_i, I_j)$$

is used in an all-pair shortest path algorithm to determine a reference frame. Here, the image with the least total shortest path cost to all the other images is selected as the reference frame.

Figure 10A:
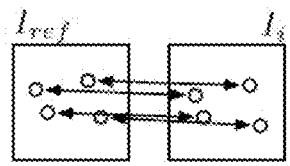
FIG. 10A shows an example of correspondences between a reference image and a different image in an image sequence.

FIG. 10A shows an example of correspondences between a reference image and a different image in an image sequence.

After 2-D registration, a reference frame $I_{ref}$ can be determined by the iterative nearest neighbor matching algorithm and the all pair shortest path algorithm. For each image $I_i$ in the sequence, the fundamental matrix $F_i$ with respect to $I_{ref}$ can be estimated using a plane+parallax method. In some implementations, an Iter-NNM routine can generate correspondences between images. Based on these correspondences, some implementations can estimate a fundamental matrix and retrieve inliers.

FIGS. 10B, 10C, 10D, and 10E show examples of different passes in a four-pass bundle adjustment technique. In some implementations, the corresponding fundamental matrix inliers, denoted as $F_{fi}$, are input to a 4-pass bundle adjustment (4P-BA) to estimate camera poses, such as camera pose information, for each corresponding image and a 3-D structure.

Figure 10B:
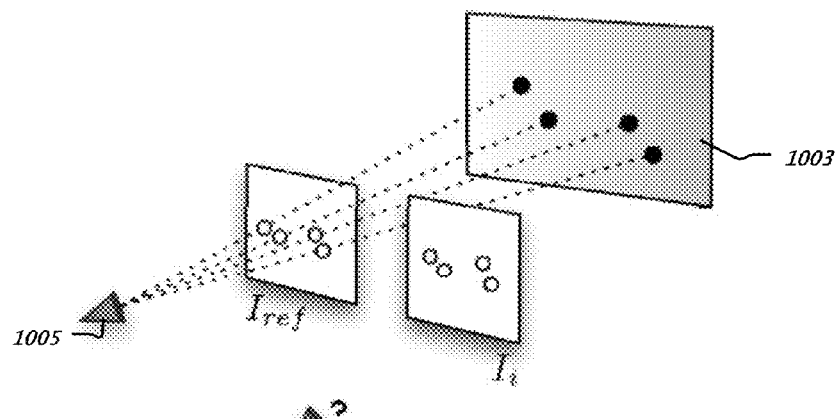
FIGS. 10B, 10C, 10D, and 10E show examples of different passes in a four-pass bundle adjustment technique.

FIG. 10B shows an example of a first-pass bundle adjustment. A first-pass bundle adjustment can assume the structure $X_i$ on the plane 1003 frontal to be parallel to the reference camera 1005 that corresponds to the reference image, and can estimate one or more camera poses by minimizing the reprojection error:

$$E(P_i) = \sum_{m^k \in FI_i} \left\| x^k_i - P_i X^k_i \right\|^2$$

where $m^k=(x_i^k, x_{ref}^k)$ is the k-th fundamental matrix inlier consist of features in $\Gamma_i$, $\Gamma_j$ respectively, and $P_i=K[R_i|T_i]$, where K is an internal camera parameter. For example, a first-pass bundle adjustment can estimate a camera pose corresponding to image $I_i$ which corresponds to camera 1010.

Figure 10C:
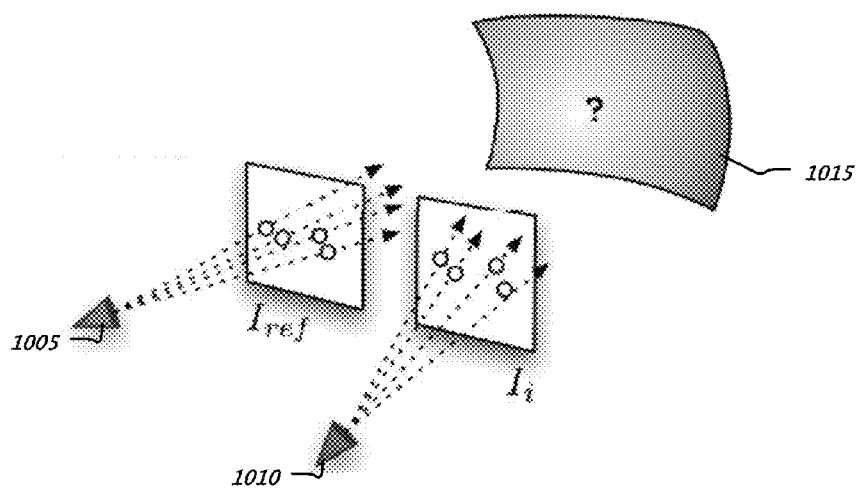

FIG. 10C shows an example of a second-pass bundle adjustment to estimate a 3-D structure 1015. In some implementations, the second-pass bundle adjustment can fix a camera pose to estimate the 3-D structure $X_i$ by triangulation.

Figure 10D:
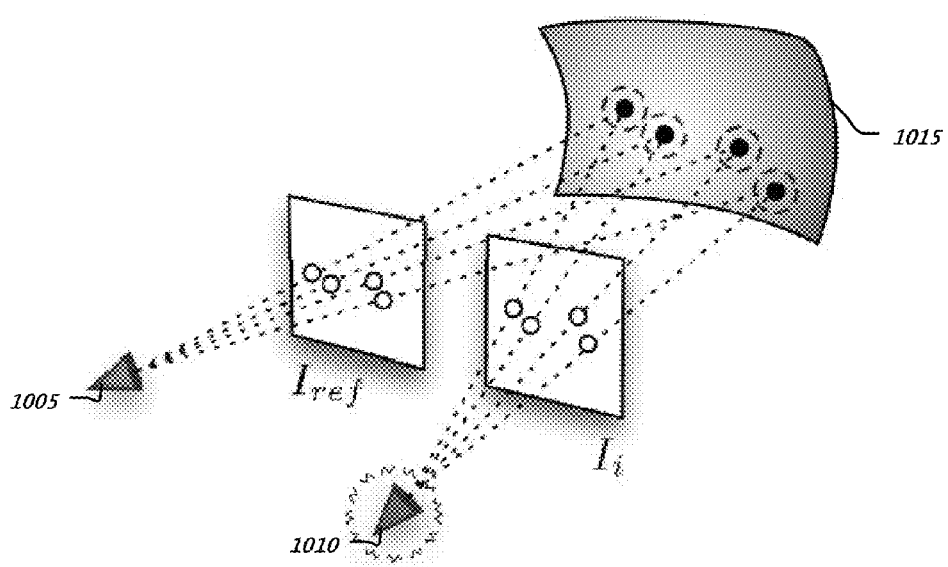

FIG. 10D shows an example of a third-pass bundle adjustment. The third-pass bundle adjustment can refine both the camera poses and the 3-D structure again by minimizing the re-projection error:

$$E(P_i, X_i) = \sum_{m^k \in FI_i} \left\| x^k_i - P_i X^k_i \right\|^2$$

where $P_1$ and $X_i$ are initialized using the output from the first-pass and second-pass bundle adjustment respectively.

Figure 10E:
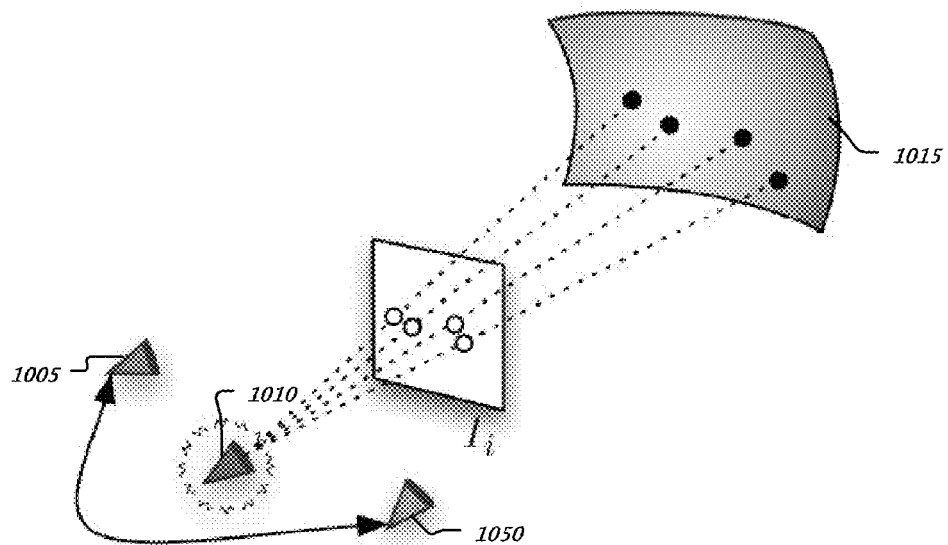

FIG. 10E shows an example of a forth-pass bundle adjustment. Let $I_{best}$ denotes the best image with respect to $I_{ref}$ for estimating the geometry. The forth-pass bundle adjustment can select the camera that has the widest baseline to the reference camera, e.g., camera 1050, and use the associated image as $I_{best}$ to estimate a sparse structure. The fourth-pass bundle adjustment can fix the sparse structure to refine other camera poses.

In the forth-pass, estimating the 3-D surface of an object can include computing dense correspondences between images $I_{ref}$ and $I_{best}$. Some implementations can rectify images using an algorithm that minimizes re-sampling effects. Some implementations can compute a disparity map between $I_{ref}$ and $I_{best}$ using window based stereo matching, in which mutual information is used as the similarity measurement of two windows. The fourth bundle adjustment can use triangulation to reconstruct the sparse structure.

Using the refined camera poses and the 3-D surface, images can be registered to the reference image by back projection. Let $x_{ref}$ be the projection of X, the back projection function is $X=bp(x_{ref})$ and image $I_i$ is registered to $I_{ref}$ by $x_i=P_iX=P_ibp(x_{ref})$.

Figure 11:
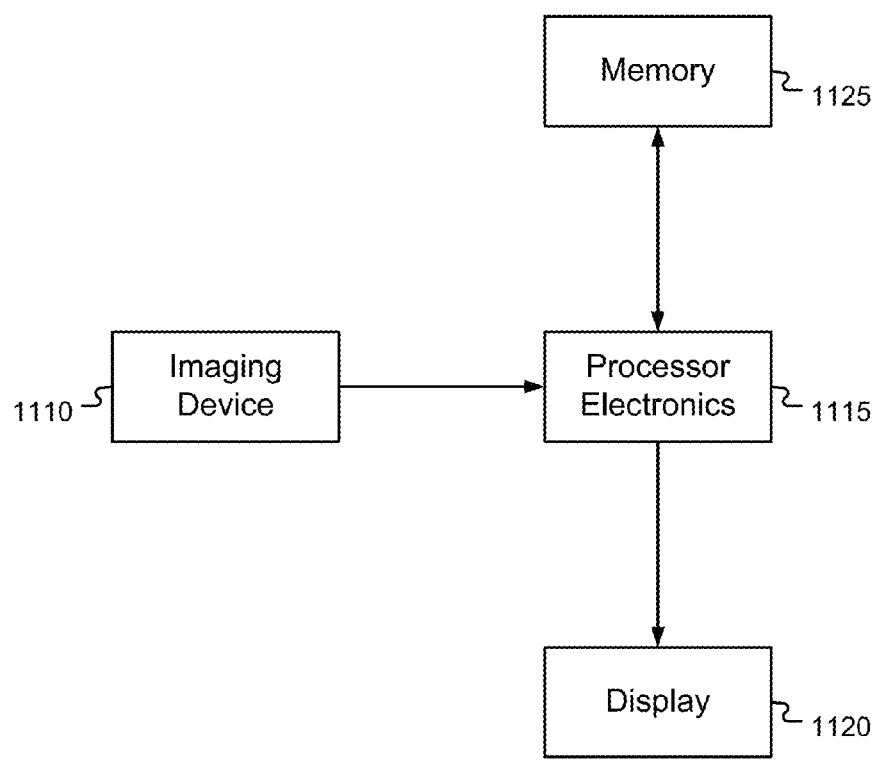
FIG. 11 shows an example of a system for three-dimensional reconstruction and registration.

FIG. 11 shows an example of a system for three-dimensional reconstruction and registration. A system can include one or more imaging devices 1110 such as a digital camera or a video camera, processor electronics 1115, memory 1125, and a display 1120. Processor electronics 1115 can include one or more processors in communication with one or more memories 1125. Memory 1125 can store data such as images of an object. Processor electronics 1115 can perform operations such as the ones described herein. Display 1120 can display information such as a 3-D reconstructed surface of an object.

Processor electronics 1115 can receive images from imaging device 1110 over a wired or wireless connection. In some implementations, imaging device 1110 can include a removable a memory storage device such as a non-volatile memory device configured to store images. Processor electronics 1115 can access images by reading data from the removable memory storage device.

Figure 12:
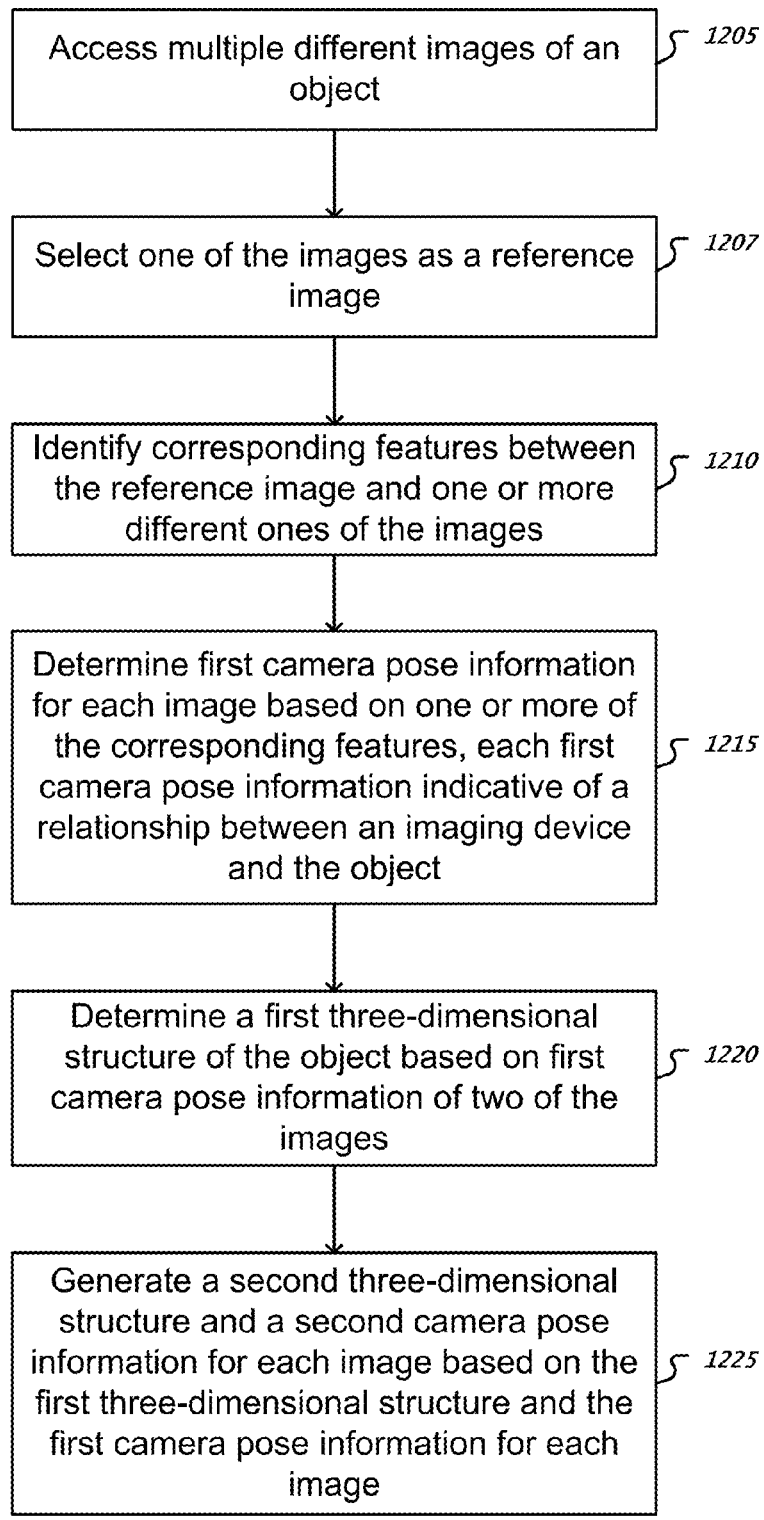
FIG. 12 shows an example of a process that includes a multi-pass bundle adjustment.

FIG. 12 shows an example of a process that includes a multi-pass bundle adjustment. In some implementations, the process is divided in to two or more processes and/or programs. The process can access multiple different images of an object (1205). In some implementations, the process can register the images in two-dimensions. Registering in 2-D can include identifying one or more features of each image and generating a two-dimensional representation of each feature. The process can select one of the images as a reference image (1207). The process can identify corresponding features between the reference image and one or more different ones of the accessed images (1210). In some implementations, the process can perform an iterative nearest neighbor matching to identify corresponding features.

The process can determine first camera pose information for each image based on one or more of the corresponding features (1215). Each of the first camera pose information can be indicative of a relationship between an imaging device and the object. In some implementations, the first camera pose information can include a rotation matrix, a translation vector, and a focal length value.

The process can determine a first three-dimensional structure of the object based on first camera pose information of two of the accessed images (1220). In some implementations, determining a first three-dimensional structure can including using a dense disparity map between the two images.

The process can generate a second three-dimensional structure and a second camera pose information for each image based on the first three-dimensional structure and the first camera pose information for each image (1225).

Implementations of the subject matter and the functional operations described in this document can be implemented in digital electronic circuitry, or in computer software, firmware, or hardware, including the structures disclosed in this document and their structural equivalents, or in combinations of one or more of them. Implementations of the subject matter described in this document can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-tactile, or tactile input.

Implementations of the subject matter described in this document can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this document, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this document contains many specifics, these should not be construed as limitations on the scope of the disclosure or of what may be claimed, but rather as descriptions of features specific to particular implementations of the disclosure. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated.

What is claimed is:

1. A computer-implemented method for image processing, comprising:
 accessing multiple different images of an object taken by one or more cameras;
 selecting one of the accessed images as a reference image;
 identifying corresponding features between the reference image and one or more different ones of the accessed images;
 determining first camera pose information for each accessed image based on one or more of the corresponding features, each first camera pose information indicative of a relationship between an imaging device and the object;
 determining a first three-dimensional structure of the object based on first camera pose information of two of the accessed images;
 generating a second three-dimensional structure and a second camera pose information for each accessed image based on the first three-dimensional structure and the first camera pose information for each accessed image;
 projecting points of the reference image to the second three-dimensional structure based on the second camera pose information associated with the reference image;
 re-projecting the projected points onto a second one of the accessed images based on the second camera pose information associated with the second one of the accessed images; and
 using the re-projected points to register the second one of the accessed images in three dimensions.

2. The method of claim 1, wherein determining the first three-dimensional structure comprises determining points on a three-dimensional structure that correspond to points on the two of the accessed images.

3. The method of claim 1,
 wherein generating the second three-dimensional structure and second camera pose information for each accessed image comprises adjusting the first three-dimensional structure and the first camera pose information for each accessed image to back-project a three-dimensional structure based on a respective camera pose information onto a respective one of the accessed images.

4. The method of claim 1, wherein selecting one of the accessed images as the reference image comprises:
 identifying features of each accessed image;
 using the identified features of each accessed image and an iterative nearest neighbor matching algorithm to determine and refine homographies and feature matches between pairs of the accessed images; and
 using an image with a least total shortest path cost to the other accessed images as the reference image, wherein a determination of the least total shortest path cost is based on the refined homographies.

5. The method of claim 1, further comprising:
 selecting one of the accessed images as a widest baseline image, the widest baseline image corresponding to a camera position with a widest baseline with respect to the reference image;
 determining a third three-dimensional structure of the object based on a mapping of points between the reference image and the widest baseline image; and
 refining the second camera pose information for each accessed image different from the widest baseline image based on the widest baseline image.

6. The method of claim 5, further comprising:
 projecting second points of the reference image to the third three-dimensional structure based on the refined second camera pose information associated with the reference image; and
 re-projecting the second projected points onto a second one of the accessed images based on the refined second camera pose information associated with the second one of the accessed images; and
 using the second re-projected points to register the second one of the accessed images in three dimensions.

7. The method of claim 1, wherein each accessed image has a near-planar surface depiction of the object.

8. The method of claim 1, wherein each camera pose information comprises a rotation matrix, a translation vector, and a focal length value.

9. The method of claim 1, further comprising:
 registering the accessed images in two-dimensions, the registering comprising identifying one or more features of each accessed image and generating a two-dimensional representation of each feature of each accessed image,
 wherein identifying corresponding features comprises using two or more of the two-dimensional representations.

10. A non-transitory computer readable medium encoded with a computer program, the program comprising instructions that when executed by data processing apparatus cause the data processing apparatus to perform operations comprising:
 accessing multiple different images of an object taken by one or more cameras;
 selecting one of the accessed images as a reference image;
 identifying corresponding features between the reference image and one or more different ones of the accessed images;
 determining first camera pose information for each accessed image based on one or more of the corresponding features, each first camera pose information indicative of a relationship between an imaging device and the object;
 determining a first three-dimensional structure of the object based on first camera pose information of two of the accessed images;
 generating a second three-dimensional structure and a second camera pose information for each accessed image based on the first three-dimensional structure and the first camera pose information for each accessed image;
 projecting points of the reference image to the second three-dimensional structure based on the second camera pose information associated with the reference image;
 re-projecting the projected points onto a second one of the accessed images based on the second camera pose information associated with the second one of the accessed images; and
 using the re-projected points to register the second one of the accessed images in three dimensions.

11. The computer readable medium of claim 10, wherein determining the first three-dimensional structure comprises determining points on a three-dimensional structure that correspond to points on the two of the accessed images.

12. The computer readable medium of claim 10, wherein generating the second three-dimensional structure and second camera pose information for each accessed image comprises adjusting the first three-dimensional structure and/or the first camera pose information for each accessed image to back-project a three-dimensional structure based on a respective camera pose information onto a respective one of the accessed images.

13. The computer readable medium of claim 10, wherein selecting one of the accessed images as the reference image comprises:
    identifying features of each accessed image;
    using the identified features of each accessed image and an iterative nearest neighbor matching algorithm to determine and refine homographies and feature matches between pairs of the accessed images; and
    using an image with a least total shortest path cost to the other accessed images as the reference image, wherein a determination of the least total shortest path cost is based on the refined homographies.

14. The computer readable medium of claim 10, the operations further comprising:
    selecting one of the accessed images as a widest baseline image, the widest baseline image corresponding to a camera position with a widest baseline with respect to the reference image;
    determining a third three-dimensional structure of the object based on a mapping of points between the reference image and the widest baseline image; and
    refining the second camera pose information for each accessed image different from the widest baseline image based on the widest baseline image.

15. The computer readable medium of claim 14, the operations further comprising:
    projecting second points of the reference image to the third three-dimensional structure based on the refined second camera pose information associated with the reference image; and
    re-projecting the second projected points onto a second one of the accessed images based on the refined second camera pose information associated with the second one of the accessed images; and
    using the second re-projected points to register the second one of the accessed images in three dimensions.

16. The computer readable medium of claim 10, wherein each accessed image has a near-planar surface depiction of the object.

17. The computer readable medium of claim 10, wherein each camera pose information comprises a rotation matrix, a translation vector, and a focal length value.

18. The computer readable medium of claim 10, the operations further comprising:
    registering the accessed images in two-dimensions, the registering comprising identifying one or more features of each accessed image and generating a two-dimensional representation of each feature of each accessed image,
    wherein identifying corresponding features comprises using two or more of the two-dimensional representations.

19. An image processing system comprising:
    a memory configured to store multiple images of an object taken by one or more cameras; and
    processor electronics in communication with the memory, configured to perform operations comprising:
    accessing multiple different images of the object;
    selecting one of the accessed images as a reference image;
    identifying corresponding features between the reference image and one or more different ones of the accessed images;
    determining first camera pose information for each accessed image based on one or more of the corresponding features, each first camera pose information indicative of a relationship between an imaging device and the object;
    determining a first three-dimensional structure of the object based on first camera pose information of two of the accessed images;
    generating a second three-dimensional structure and a second camera pose information for each accessed image based on the first three-dimensional structure and the first camera pose information for each accessed image;
    projecting points of the reference image to the second three-dimensional structure based on the second camera pose information associated with the reference image;
    re-projecting the projected points onto a second one of the accessed images based on the second camera pose information associated with the second one of the accessed images; and
    using the re-projected points to register the second one of the accessed images in three dimensions.

20. The system of claim 19, wherein determining the first three-dimensional structure comprises determining points on a three-dimensional structure that correspond to points on the two of the accessed images.

21. The system of claim 19, wherein generating the second three-dimensional structure and second camera pose information for each accessed image comprises adjusting the first three-dimensional structure and/or the first camera pose information for each accessed image to back-project a three-dimensional structure based on a respective camera pose information onto a respective one of the accessed images.

22. The system of claim 19, wherein selecting one of the accessed images as the reference image comprises:
    identifying features of each accessed image;
    using the identified features of each accessed image and an iterative nearest neighbor matching algorithm to determine and refine homographies and feature matches between pairs of the accessed images; and
    using an image with a least total shortest path cost to the other accessed images as the reference image, wherein a determination of the least total shortest path cost is based on the refined homographies.

23. The system of claim 19, the operations further comprising:
    selecting one of the accessed images as a widest baseline image, the widest baseline image corresponding to a camera position with a widest baseline with respect to the reference image;
    determining a third three-dimensional structure of the object based on a mapping of points between the reference image and the widest baseline image; and
    refining the second camera pose information for each accessed image different from the widest baseline image based on the widest baseline image.

24. The system of claim 23, the operations further comprising:
  projecting second points of the reference image to the third three-dimensional structure based on the refined second camera pose information associated with the reference image; and
  re-projecting the second projected points onto a second one of the accessed images based on the refined second camera pose information associated with the second one of the accessed images; and
  using the second re-projected points to register the second one of the accessed images in three dimensions.

25. The system of claim 19, wherein each accessed image has a near-planar surface depiction of the object.

26. The system of claim 19, wherein each camera pose information comprises a rotation matrix, a translation vector, and a focal length value.

27. The system of claim 19, the operations further comprising:
  registering the accessed images in two-dimensions, the registering comprising identifying one or more features of each accessed image and generating a two-dimensional representation of each feature of each accessed image,
  wherein identifying corresponding features comprises using two or more of the two-dimensional representations.

* * * * *